United States Patent [19]
Sebald

[11] Patent Number: 5,503,063
[45] Date of Patent: Apr. 2, 1996

[54] PIZZA CRISPER

[75] Inventor: Robert V. Sebald, Canton, Ohio

[73] Assignee: Ekco Housewares, Inc., Franklin Park, Ill.

[21] Appl. No.: 190,942

[22] Filed: Feb. 3, 1994

[51] Int. Cl.[6] .................................................. A47J 37/01
[52] U.S. Cl. ........................ 99/447; 99/450; 99/445; 99/432; 99/DIG. 15
[58] Field of Search ............................ 99/450, 422, 425, 99/444, 445, 447, DIG. 15, 432; 220/912

[56] References Cited

U.S. PATENT DOCUMENTS

| | | | |
|---|---|---|---|
| 254,770 | 3/1882 | Hurd . | |
| 476,340 | 6/1892 | Wagandt . | |
| 868,312 | 10/1907 | Wilcox | 99/DIG. 15 |
| 1,200,741 | 10/1916 | Lindgren | 99/450 |
| 1,316,365 | 9/1919 | Jackson . | |
| 1,781,302 | 11/1930 | Roberts . | |
| 2,346,839 | 4/1944 | Harriss et al. . | |
| 2,413,204 | 12/1946 | Wolff . | |
| 2,573,719 | 11/1951 | Lebherz . | |
| 2,924,369 | 2/1960 | Richter | 99/DIG. 15 |
| 4,078,479 | 3/1978 | Mori | 99/422 |
| 4,176,591 | 12/1979 | Power . | |
| 4,563,946 | 1/1986 | Barlow et al. . | |
| 4,603,052 | 7/1986 | El-Hag et al. | 99/450 |
| 4,676,151 | 6/1987 | Gorsuch et al. | 99/DIG. 15 |
| 4,768,427 | 9/1988 | Cheng | 99/422 |
| 5,076,434 | 12/1991 | Hoffman, Jr. | 99/DIG. 15 |
| 5,078,050 | 1/1992 | Smith | 99/DIG. 15 |
| 5,242,704 | 9/1993 | Prestigiacomo | 99/450 |
| 5,351,608 | 10/1994 | Muchin et al. | 99/422 |

Primary Examiner—David Scherbel
Assistant Examiner—James F. Hook
Attorney, Agent, or Firm—Henry D. Pahl, Jr.

[57] ABSTRACT

The pizza crisper disclosed herein is formed of aluminum sheet metal and comprises a bottom portion and an annular rim which rises above the bottom portion. The bottom portion is perforate and comprises a succession of annular lands separated by annular grooves which can be substantially bridged by pizza dough thereby to facilitate air circulation and the venting of moisture.

4 Claims, 2 Drawing Sheets

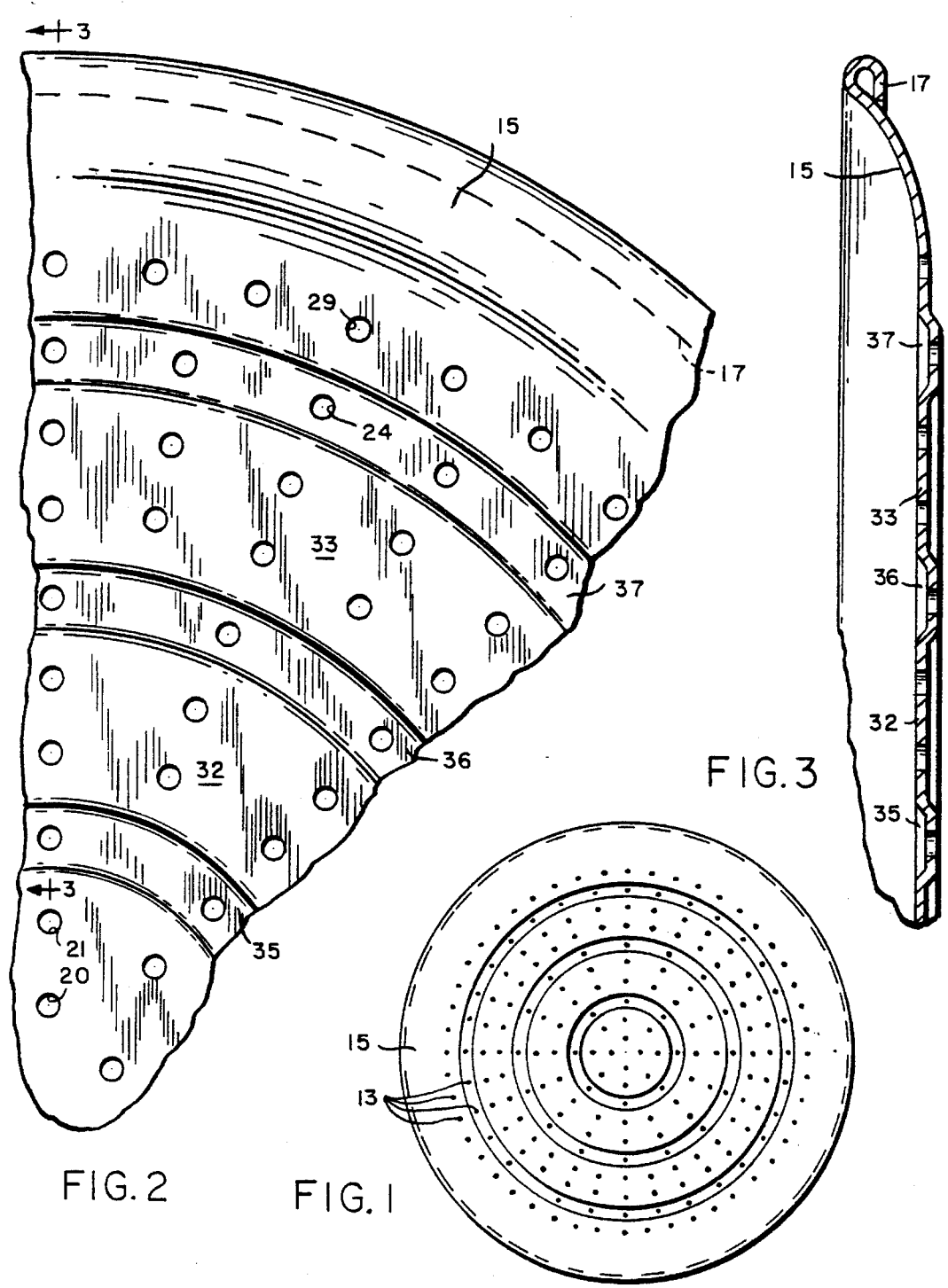

PIZZA CRISPER

BACKGROUND OF THE INVENTION

The present invention relates to pans and more particularly to a pan for crisping a dough based food article such as pizza.

There is increasing consumer interest in preparing dough based articles such as pizza in the home either using fresh dough to make a pizza from scratch or utilizing partially prepared pizzas which may be sold as frozen goods, for a subsequent final cooking and crisping by the consumer. This consumer interest has generated a need for a suitable pan which will facilitate the cooking and/or crisping of a pizza product, without the use of a commercial oven. Various attempts to devise such a pan have been proposed heretofore e.g. such as the construction show in the Barlow et al U.S. Pat. No. 4,563,946, but such attempts have not been entirely successful.

Among the several objects of the present invention may be noted the provision of an improved pan for crisping dough based food articles such as pizza; the provision of such a pan which promotes uniform cooking; the provision of such a pan which facilitates the release of moisture from baked dough or crust; the provision of such a pan which facilitates a browning or crisping effect; the provision of such a pan which facilitates use in a domestic cooking environment; the provision of such a pan which is highly reliable and which is of relatively simple and inexpensive construction. Other objects and features will be in part apparent and in part pointed out hereinafter.

SUMMARY OF THE INVENTION

A crisping pan in accordance with the present invention provides a bottom portion and, surrounding that bottom portion, a raised rim. The bottom portion provides a succession of annular lands separated by annular grooves which can be bridged by dough. Preferably, at least the grooves are perforated to allow venting of moisture from the dough.

BRIEF DESCRIPTION OF THE DRAWINGS

FIG. 1 is a plan view of a pizza crisping pan in accordance with the present invention;

FIG. 2 is a plan view, to a substantially enlarged scale, of a section of the pan of FIG. 1;

FIG. 3 is a side view, in section, taken substantially on the line 3—3 of FIG. 2 showing convolutions in the bottom of the pan.

Corresponding reference characters indicate corresponding parts throughout the several views of the drawings.

DESCRIPTION OF THE PREFERRED EMBODIMENT

Figure 4:
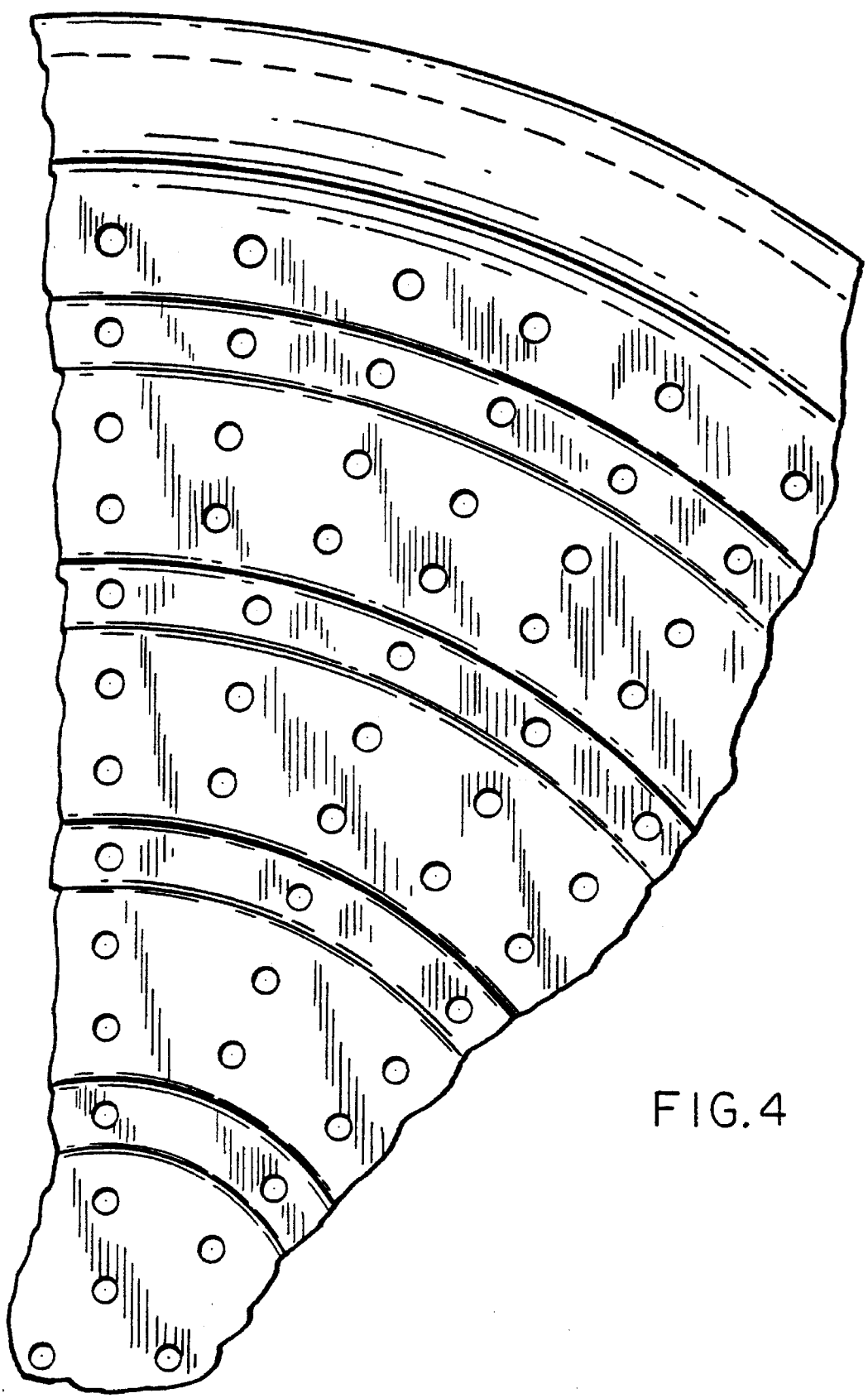
FIG. 4 is a view, similar to FIG. 2, showing an alternate pan construction.

Referring now to FIGS. 1–3, the pizza crisping pan illustrated there is constructed of sheet metal of essentially uniform thickness, e.g. aluminum alloy 3003 of 0.040 inch thickness. The pan illustrated is 12¾ inches in diameter and provides a 10.45 inch diameter bottom portion, designated generally by reference character 13, surrounded by an upwardly convex annular raised rim portion 15. Rim portion 15 terminates in a rolled edge designated generally by reference character 17. The height of the rim is preferably about 0.55 inches.

The bottom portion 13 is perforated in a pattern forming a series of essentially equally spaced rings of perforations, the perforations in the successive rings being designated by reference characters 20–29 moving from the innermost ring to the outermost ring. As may be seen from the drawings, the number of perforations in the rings increases from innermost to outermost. The size of the perforations is preferably about ⅛ inch diameter.

In accordance with an important aspect of the present invention, the bottom portion 13 is also shaped or convoluted to provide a succession of annular lands separated by annular grooves. The lands are designed by reference characters 31–34 while the grooves are designed by reference characters 35–37.

In accordance with the practice of the present invention, the width of each of the grooves 35–37 is selected so that it can be substantially bridged by pizza dough, that is, pizza dough placed in the pan without substantial additional pressure will contact only a minor portion of the surface within each groove, if it contacts it at all. A width of about ⅜ inch is appropriate for the grooves. The lands 31–34 are preferably wider than the grooves 35–37, e.g. 1⅛ inch wide, and, preferably, each land encompasses a plurality of the rings of perforations. In the preferred embodiment illustrated, each of the lands spans two rings of perforations while each of the grooves spans a single ring.

As indicated, the function of the depressed grooves 35–37 is to allow an air circulation between the pizza crust and the pan. This air circulation facilitates release of moisture from the crust and the elevated ambient oven air facilitates the browning and/or crisping of the pizza crust. The air holes in the grooves admit the ambient air and permit the release of moisture. Using the pizza pan of the present invention accordingly facilitates a desirable crisping of the pizza crust and avoids the making of a soggy or overly moist product.

The alternate construction illustrated in FIG. 4 is conceptually similar to that illustrated in FIGS. 1–3 but permits the making of a larger size pizza. The pan of FIG. 4 is 15¾ inches in diameter having a 13.45 inch diameter bottom portion which provides five lands and four grooves. The arrangement of the lands and grooves and the perforations in the central portion is essentially the same as the bottom of the product illustrated in FIGS. 1 and 3 so that much common tooling may be employed and so that the smaller size pan can nest inside the larger pan.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A pizza pan formed from aluminum sheet metal of essentially uniform thickness, said pan comprising:

a bottom portion and, surrounding said bottom portion, a circular rim which rises in an upwardly concave arc above said bottom portion, said bottom portion being perforated with unrimmed holes in a pattern forming a series of essentially equally spaced concentric circular rings of perforations, said bottom portion being further characterized in comprising a series of flat annular lands separated by flat annular grooves which can be substantially bridged by pizza dough, each of said lands spanning a plurality of said rings with each of said grooves spanning a single ring thereby to provide venting of the bridged spaces.

2. A pan set forth in claim 1 wherein said grooves are about ⅜ inch wide.

3. A pan set forth in claim 2 wherein said perforations are about ⅛ inch in diameter.

4. A pan set forth in claim 3 wherein said lands are about 1⅛ inch wide.

\* \* \* \* \*